April 29, 1947.  F. A. BARNES  2,419,702

QUICK DETACHABLE COUPLING

Filed Aug. 5, 1944

INVENTOR.
FREDERICK A. BARNES
BY
Hyde and Meyer
ATTORNEYS.

Patented Apr. 29, 1947

2,419,702

UNITED STATES PATENT OFFICE 2,419,702

QUICK DETACHABLE COUPLING

Frederick A. Barnes, Cleveland Heights, Ohio

Application August 5, 1944, Serial No. 548,175

2 Claims. (Cl. 285—177)

This invention relates to a quick detachable coupling for connecting together generally cylindrical parts and is particularly useful for providing a leak-proof joint between tubular ends.

It is an object of the present invention to provide a quick detachable coupling which consists of a minimum number of parts adapted to be easily machined out of bar stock and one which provides a very positive and dependable connection.

The construction and advantages of my improved device will be apparent from the accompanying description, and the essential features will be summarized in the claims.

In the drawings,

Fig. 5 is a transverse sectional view enlarged taken along the line 5—5 of Fig. 1; while

Figure 1:
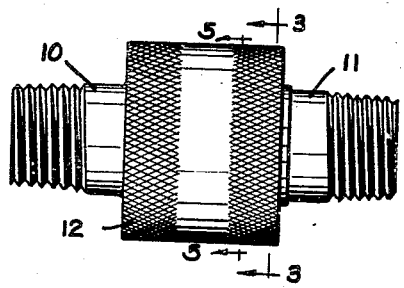
Fig. 1 is a side elevational view of one form of my coupling device.

While some of the features of my device are adaptable for connecting solid or tubular parts for various purposes, I have chosen to illustrate the same as used for connecting two generally cylindrical tubular parts such as are found, for instance, in a compressed air line. By this illustration, however, I do not intend to limit the use of my device.

In the various views, 10 and 11 represent the two parts to be coupled while 12 is the coupling sleeve. The part 10 has an enlarged cylindrical portion 10a which carries the coarse thread 10b. At its coupling end, the part 10 has diametrically opposed ears 10c extending parallel to the axis of the member 10 and toward the other part 11 which is to be coupled.

The part 11 has an enlarged cylindrical portion 11a terminating in a flange 11b extending radially outwardly and interrupted to provide the diametrically opposed recesses 11c which are adapted to receive the tongues 10c in a relatively snug fit. When the parts 10 and 11 are to be coupled, the tongues 10c and the recesses 11c coact to provide means for preventing relative rotation between the parts 10 and 11 when the coupling action takes place.

The sleeve 12 is provided with an internal thread 12a adapted to coact with the thread 10b. At the end of the sleeve nearer the part 11, there are provided two lugs 12b extending radially inwardly at diametrically opposite points and adapted to lie on that side of the flange 11b farthest away from the abutting ends of the coupling as clearly shown in Fig. 4. These lugs are adapted to pass through the recesses 11c.

Figure 2:
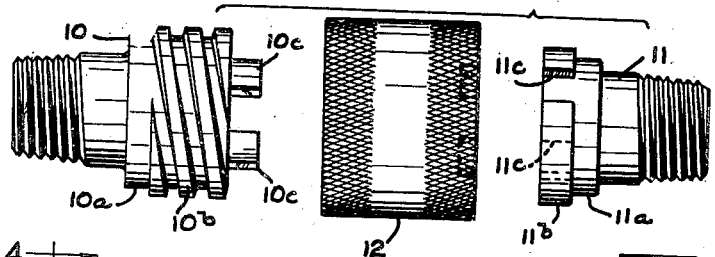
Fig. 2 is an exploded view of the parts of Fig. 1.
Figure 3:
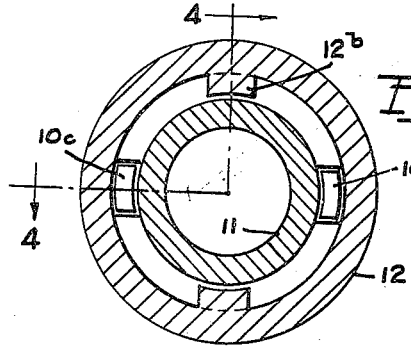
Fig. 3 is an enlarged transverse sectional view taken along the line 3—3 of Fig. 1.
Figure 4:
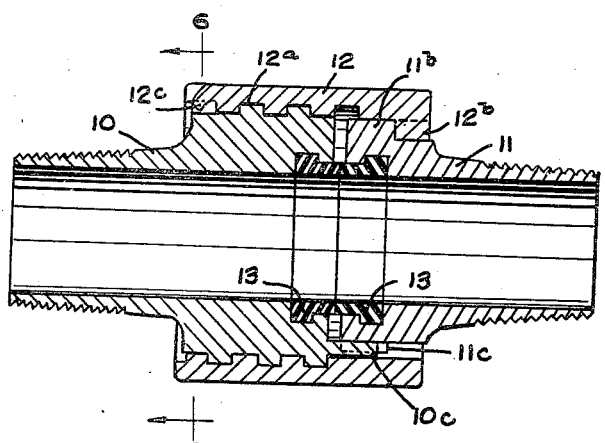
Fig. 4 is a sectional view taken along the line 4—4 of Fig. 3.

It results from the above-described construction that when the parts 10 and 11 are placed with their ends abutting as shown in Fig. 4, the tongues 10c enter the recesses 11c and prevent relative rotation between the parts 10 and 11. The sleeve 12 has already been threaded so as to engage the threads 10b and 12a. The part 11 is moved into abutting engagement with the part 10 by passing the flange 11b into the right-hand end of the sleeve 12 as shown in Figs. 2 and 4, this movement being possible because the lugs 12b are adapted to pass through the recesses 11c. With the parts in the position of Fig. 4, relative rotation is produced between the sleeve 12 and the interengaged parts 10 and 11 which are compelled to rotate as a unit because of the engagement of the tongues 10c in the recesses 11c. This rotation of sleeve 12 in a direction to cause the interengaging threads to move the part 10 toward the part 11 causes a firm engagement between the abutting ends of the parts 10 and 11 because the lugs 12b now lying behind the flange 11b prevent movement of the part 11 away from the part 10. In actual practice, a very slight rotation of sleeve 12 serves to firmly connect the parts 10 and 11.

Figure 5:
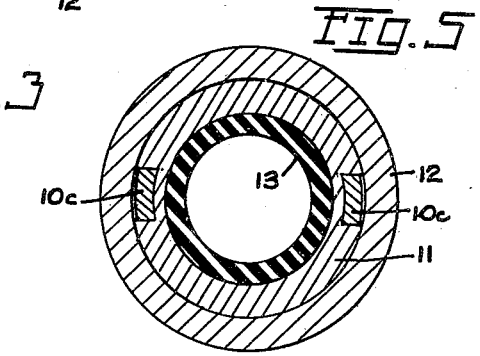

While it would be possible to provide a machined joint between parts 10 and 11, for some purposes I prefer to provide a sealed joint at this point for the handling of compressed air or other fluids. To this end, as best shown in Figs. 4 and 5, I insert annular gaskets 13 of natural or synthetic rubber or other suitable sealing material in proper seats in the abutting ends of the parts 10 and 11. Then when the parts are coupled as previously described, the abutting gaskets 13, which project beyond the metal parts 10 and 11 as shown in Fig. 4, are forcibly compressed together to provide a leak-proof joint at this point.

Preferably I utilize a cheaply constructed device for holding the parts 10 and 12 in more or less permanent engagement so that when the part 10 is connected to one hose and the part 11 to another, there are no loose parts to be lost. This means for securing the parts 10 and 12 together consists in the striking out and peening over a small tongue 12c from the metal of sleeve 12 at the end of the sleeve near the shoulder of the portion 10a so that the tongue 12c prevents unscrewing of the part 10 out of the sleeve 12.

Figure 6:
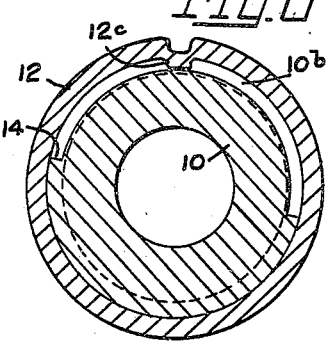
Fig. 6 is a transverse sectional view taken on the line 6—6 of Fig. 4.

Preferably, also, I mill out a portion of the thread 10b as shown in Fig. 6 to provide a shoulder 14 so arranged with respect to the tongue 12c that when the part 10 is screwed out of the sleeve 12 until the shoulder 14 strikes the tongue 12c, the tongues 10c will be aligned with the lugs 12b so that as the part 11 is moved endwise into the sleeve 12, the recesses 11c will first pass over the lugs 12b and then into engagement to receive the tongues 10c. Thus the shoulder 14 and the tongue 12c serve to automatically position the parts for easy engagement after which the minimum rotation of sleeve 12 couples the parts 10 and 11. Knurling may be provided if desired on the outside of sleeve 12 to aid in its rotation.

The screwing of the part 10 into and through the sleeve 12 is possible to only a limited extent and is hindered when one of the tongues 10c strikes one of the lugs 12b. I have thus prevented loss of any of the parts when the device is connected to the ends of a hose to be coupled or in any similar application.

Note that my improved coupling may not be accidentally disconnected as by dragging of a compressed air hose over the floor. Note also that I do not rely upon a packing adapted to be expanded by the compressed fluid but instead I use a packing or sealing material 13 which is positively compressed by the parts of the coupling.

What I claim is:

1. In a quick detachable coupling, two tubular parts to be coupled in axial alinement with their ends abutting, said parts having their inside diameters equal, an annular flange extending radially outwardly near the end of a first of said parts, there being a plurality of recesses extending axially through said flange and opening radially outwardly of said flange and spaced regularly about its circumference, a plurality of tongues extending from the end of a second of said parts substantially parallel to its tubular axis and adapted to enter said recesses when said ends abut, a sleeve surrounding said abutting ends, said sleeve having an internal diameter snugly embracing the outer circumference of said flange, interengaging threads on said sleeve and said second part, and a plurality of lugs extending radially inwardly from said sleeve and adapted to pass through said recesses to lie in back of said flange, whereby with said tongues, lugs and recesses alined said ends may be placed in abutting relation with said lugs on the side of said flange away from said abutting ends, and rotation of said sleeve will move said abutting ends tightly together, after which said sleeve prevents angular play of said first part relative to said second part.

2. The combination of claim 1 including co-acting stop means on the end of said sleeve removed from said lugs and on the end of said threaded second part farthest from said abutting ends, said stop means effective upon backing off the sleeve on the threads of said second part to aline said tongue with said lugs.

FREDERICK A. BARNES.

REFERENCES CITED

The following references are of record in the file of this patent:

UNITED STATES PATENTS

| Number | Name | Date |
|---|---|---|
| 1,238,218 | Thompson | Aug. 28, 1917 |
| 809,746 | Rhoads | Jan. 9, 1906 |